(12) United States Patent
Matsuhira et al.

(10) Patent No.: US 8,026,996 B2
(45) Date of Patent: Sep. 27, 2011

(54) DISPLAY DEVICE

(75) Inventors: Tsutomu Matsuhira, Chiba (JP); Tomoko Matsuhira, legal representative, Chiba (JP); Masayuki Ichino, Chiba (JP); Isamu Hashizume, Chiba (JP); Yoichi Kagaya, Chiba (JP)

(73) Assignee: Seiko Instruments Inc. (JP)

( * ) Notice: Subject to any disclaimer, the term of this patent is extended or adjusted under 35 U.S.C. 154(b) by 275 days.

(21) Appl. No.: 12/288,815

(22) Filed: Oct. 23, 2008

(65) Prior Publication Data

US 2009/0185100 A1    Jul. 23, 2009

(30) Foreign Application Priority Data

Oct. 24, 2007   (JP) .................................. 2007-276593
Oct. 16, 2008   (JP) .................................. 2008-267629

(51) Int. Cl.
*G02F 1/1333*   (2006.01)
(52) U.S. Cl. ....................................................... 349/60
(58) Field of Classification Search ................... 349/60, 349/58
See application file for complete search history.

(56) References Cited

U.S. PATENT DOCUMENTS 5,835,179 A * 11/1998 Yamanaka .................... 349/161

OTHER PUBLICATIONS

Abstract, Publication No. JP2007225633, Publication Date Sep. 6, 2007.
Abstract, Publication No. JP2007193160, Publication Date Aug. 2, 2007.
Abstract, Publication No. JP2003156740, Publication Date May 30, 2003.
Abstract, Publication No. JP11305226, Publication Date Nov. 5, 1999.

* cited by examiner

*Primary Examiner* — James Dudek
(74) *Attorney, Agent, or Firm* — Adams & Wilks (57) ABSTRACT

A display device includes a display panel having first and second opposing glass substrates forming a display surface, a transparent member, a first adhesive material bonding the transparent member to the entire display surface of the display panel, and a plate-like member disposed on a rear side of and supporting the display panel. A second adhesive material different from the first adhesive material is disposed between a rear surface of the transparent member and a front surface of the plate-like member so as to fixedly bond the transparent member and the plate-like member to one another.

19 Claims, 4 Drawing Sheets

DISPLAY DEVICE

BACKGROUND OF THE INVENTION

1. Field of the Invention

The present invention relates to a display device including a thin display panel. More particularly, the present invention relates to a reinforced structure of a display device in which a display panel is sandwiched between a plate member and a protective plate or a touch panel disposed on a display surface side. For example, the present invention is applicable to portable electronic devices such as a cellular phone, a PDA, or an electronic dictionary, and a display device thereof. Examples of the thin display panel include a liquid crystal display device of a passive matrix system, which uses an STN or TN liquid crystal, a liquid crystal display device of an active matrix system that drives the TN liquid crystal by a TFT element in a VA mode or an IPS mode, an organic EL display, and a plasma display.

2. Description of the Related Art

A liquid crystal panel has been known as a typical thin display panel. The liquid crystal panel has a structure in which two glass substrates each having a color filter or a TFT formed thereon are bonded to each other with a sealing agent provided on an outer periphery of the glass substrates, and liquid crystal is sealed in a gap between those glass substrates. Drive signals are applied to electrodes disposed on the surfaces of the glass substrates to drive the liquid crystal. The drive signals are supplied by a driver IC mounted face-down on the glass substrates by an anisotropic conductive film. The liquid crystal panel controls liquid crystal molecules according to an ON signal or an OFF signal contained in the drive signal, and controls the absorption and transmission of light by means of absorptive polarizing plates disposed on the front surface and the rear surface of the liquid crystal panel for display.

The display systems are classified into a reflection type and a transmission type. In the transmission type, a backlight is disposed behind the liquid crystal panel. The backlight is classified into a side light system in which a light source such as an LED or a cold cathode fluorescent tube is disposed at a side surface of a light guide plate, which surface-emits a light therefrom, and a direct type system in which the light source is disposed directly below the display surface, and the light is diffused with a diffuser into a uniform light to conduct surface emission. Further, in order to improve the luminance, a diffusion sheet or a lens sheet may be disposed. The lens sheet has a structure in which a plurality of fine lenses are arranged linearly in parallel to each other, and has a function of condensing the light in one axial direction. In order to condense the lights in an x-axis direction and a y-axis direction, two lens sheets may be disposed in lamination. When the pitches of prisms of the lens sheets interfere with the pixels of the liquid crystal panel to generate a moiré pattern, there is employed a method involving changing the pitches of the lenses. The diffusion sheet is configured such that ink containing fine particles is formed on the surface of a transparent film.

In order to efficiently emit the light, a sheet having a high reflectivity of light, such as a sheet on which silver is deposited is disposed under the light guide plate of the side light system or under a fluorescent tube of the direct type system. As a method of fixing the backlight and the liquid crystal panel to each other, there has been generally used a light shielding double-faced tape having a thickness of about 0.02 to 0.10 mm. The light shielding double-faced tape is disposed in the outer periphery of the display portion of the liquid crystal panel, to thereby fix the liquid crystal panel onto the backlight. The light shielding double-faced tape used in this example is a double-faced tape which is white on the backlight side and is black on the liquid crystal panel side. As a method of improving the impact resistance, there is given a method in which an elastic member having light scattering particles is used as a shock absorbing member, and the rear surface of the liquid crystal panel and the light emission surface of the backlight are attached firmly to each other (for example, refer to JP 2999369 B).

Further, there has been known a structure in which a concave portion into which the diffuser or the lens sheet are incorporated is defined in the light guide plate of the backlight, the light shielding double-faced tape is disposed on the outer periphery of the light guide plate, by which a film is bonded to configure the backlight, and the film and the liquid crystal panel are bonded firmly to each other, to thereby improve the thrust strength (for example, refer to JP 2004-347957 A).

In the actual product, a protective plate, a transparent touch panel, or the like is disposed as a transparent member on the liquid crystal display surface. The protective plate is made of acrylic such as PMMA or hardened glass. A metal thin film made of chromium or nickel and a color print such as black may be laminated on the outer periphery of the protective plate to form a window frame. Further, the window frame may be formed by means of only color printing. In general, a hard coating for damage prevention is formed on the surface of the PMMA. In case that the glass thickness is 10 mm to 0.5 mm, chemically hardened glass is frequently used as the hardened glass. In particular, when the glass thickness is thicker, an air-quench hardened glass is adopted. The touch panel is classified into an analog resistive film system, a digital resistive film system, a capacitance system, an ultrasonic system, or an electromagnetic induction system. In the case of the electromagnetic induction system, a glass substrate for damage prevention may be bonded onto the display surface of the display panel. Similarly, in the capacitance system, the hardened glass may be bonded onto the display surface.

The transparent member and the display panel are bonded and fixed to each other by the frame-like double-faced adhesion tape disposed on the outer periphery of a display area. Alternatively, a transparent adhesive or a transparent adhesion sheet is disposed on the entire area including the display area so that the transparent member and the display panel are bonded onto each other over the entire surface.

Further, as structures where the display device including the transparent member on the display surface side is housed in an electronic device, there are given a structure in which the display device is held from the upper portion of the outer periphery of the transparent member with an aid of an exterior case including an opening at a display portion, a structure in which the transparent member is provided with a step, and a lower level of the step is held by the exterior case, and a structure in which the transparent member includes an outer peripheral portion for fixing, which is larger than the display panel, an adhesive sheet is bonded onto the rear surface of the outer peripheral portion, and the outer peripheral portion is bonded and fixed to the electronic device.

As the thinned portable device such as a cellular phone is increasingly desired, it is necessary to made thin the glass substrate that constitutes the display panel, and to thin the light guide plate of the backlight of the side light type. For example, in the liquid crystal panel, the thinning is advanced to such an extent that the thickness of the glass substrate is 0.10 to 0.15 mm, and the thickness of the light guide plate is 0.25 mm. However, because those members are thinned, the glass substrate is frequently broken due to an impact caused by dropping or the like. Under the above-mentioned circumstances, in order to prevent the glass substrate from being broken, there is adopted a system in which a hardened glass is used for the protective plate on the display surface side, or the protective plate is bonded to the entire display surface of the liquid crystal panel with an aid of an optical adhesive or an optical sheet.

However, there are many cases in which a case of the main body of a cellular phone and the like is largely deformed due to the impact caused by dropping or the like, and the liquid crystal panel is damaged due to the deformation. Under the above-mentioned circumstances, the material of a frame of the backlight is changed from plastic to a material that is high in Young's modulus, such as magnesium. However, the breakage of the liquid crystal panel due to the impact, in particular, the breakage that occurs in the glass substrate on the rear surface side upon receiving damage from a part which is disposed on the back side can be hardly reduced.

Further, in the structure where the liquid crystal panel and the light guide plate of the backlight are bonded tightly to each other with an aid of the elastic member, there arises such problems that peeling is liable to occur due to thermal expansion at high temperature or at low temperature, and the luminance is deteriorated because the optical sheet such as the lens sheet cannot be provided.

In order to prevent the peeling, there is proposed a structure in which the rear surface of the liquid crystal panel is bonded directly to the entire light emission surface of the light guide plate by the optical adhesive. In this structure, the optical adhesive exists between the optical sheet provided on the front surface of liquid crystal panel and the light guide plate. Because the refractive index of the optical sheet is close to the refractive index of the optical adhesive, the optical function of the optical sheet is deteriorated, and the luminance of the display surface is deteriorated. Even in a structure where the rear surface of the liquid crystal panel is bonded to the entire surface of the light guide plate without the optical sheet, the luminance is deteriorated as compared with the backlight using the optical sheet. In any cases described above, the optical disadvantage occurs.

Further, when the rear surface of the liquid crystal panel is bonded directly to the light guide plate by the optical adhesive, the strength is improved with respect to an impact in the pushed direction, but the seal of the liquid crystal panel is peeled off when an impact is applied in the peeling direction.

In the electronic device using the display device, when the display device with a structure in which the transparent member is bonded onto the display panel is held by the exterior case from the outer peripheral upper surface, the electronic device is thickened by the thickness of the exterior case. In this case, the electronic device is limited in terms of design. Further, even in the structure where the transparent member is provided with a step, it is necessary to thicken the transparent member in order to form the step. In the structure where the transparent member is enlarged, and the adhesive sheet is disposed on the rear surface, an "adhesive fixation overlap width" that is equal to or higher than a given width is required. This leads to such a problem that the frame becomes larger.

SUMMARY OF THE INVENTION

Under the above-mentioned circumstances, it is an object of the present invention to provide a thin display device that is high in impact resistance without any deterioration of luminance efficiency, and does not allow a seal of a panel to be peeled off, and an electronic device that uses the display device by incorporating in a thin narrow frame shape.

In order to solve the above-mentioned problems, there is provided a display device in which a touch panel or a transparent protective plate such as hardened glass or PMMA is disposed on a display surface side of a display panel, and a plate-like member is disposed on a rear surface side of the display panel, in which: at least a part of a transparent plate (for example, touch panel or transparent protective plate) which is disposed on the display surface of the display panel protrudes from an outer periphery of the display panel; the plate-like member that is disposed on a rear surface of the display panel also protrudes from the outer periphery of the display panel at the same portion as that of the transparent plate; and a rear surface of the protruding portion of the transparent plate is bonded and fixed to a front surface of the protruding portion of the plate-like member by means of an adhesive material.

That is, the display device according to the present invention includes: the display panel; the transparent member that is bonded to the display surface of the display panel with a first adhesive material; and the plate-like member that is disposed on the rear surface side of the display panel and holds the display panel, in which the transparent member and the plate-like member are bonded and fixed to each other at a portion where the transparent member and the plate-like member are overlapped with each other outside of the display panel with a second adhesive material. As a result, the impact resistance is improved.

Further, the display panel is bonded to an entire surface of the transparent member with an aid of a transparent optical adhesive layer (for example, transparent optical adhesive or transparent optical adhesive sheet) as the first adhesive material. As a result, the strength is further improved.

When the display panel of a non-self-emitting type, such as the liquid crystal panel is used as the display panel, an optical component such as a light guide plate of a backlight or a diffuser is formed of plate-like shape to enable the thin structure. In the case of a side light type backlight, the plate-like member is the light guide plate, and an optical sheet such as a diffusion sheet or a lens sheet is disposed on a light emission surface of the light guide plate. A flow stop member for the second adhesive material is disposed in the vicinity of the outer periphery of the optical sheet. Further, the light guide plate may be provided with a concave portion having a contour larger than the optical sheet and a depth substantially equal to or deeper than the optical sheet, and the optical sheet may be incorporated into the concave portion.

Alternatively, a frame that fixes the light guide plate of the side light type can be used as the plate-like member. The light guide plate that is a separate part is fitted into a position of the rear surface of the display surface. The frame is provided with an opening portion into which the light guide plate is fitted, and the optical sheet such as the diffusion sheet or the lens sheet is fitted into a gap between the light guide plate and the display panel. The flow stop member for the second adhesive material is disposed in the vicinity of an outer periphery of the optical sheet.

Further, a convex portion is formed on an outer periphery of at least a part of the plate-like member in the vicinity of an outside of the display panel, and the rear surface of the transparent member and the convex portion of the plate-like member are bonded and fixed to each other by means of the second adhesive material, to thereby further improve the adhesive strength.

DETAILED DESCRIPTION OF THE PREFERRED EMBODIMENTS

A display device according to the present invention includes a display panel, a transparent member that is bonded to a display surface of the display panel with a first adhesive material, and a plate-like member that is disposed on a rear side of the display panel. At least parts of the transparent member and the plate-like member are protruded from the contour of the display panel, and the protruded portions of the transparent member and the plate-like member face each other. A second adhesive material is supplied between the protruded portion of the transparent member and the protruded portion of the plate-like member, and the transparent member and the plate-like member are bonded and fixed to each other together with a side surface of the display panel. Here, the first adhesive material is disposed at least in the vicinity of the outer periphery of the display panel, with the result that the display panel is bonded to the transparent member. Further, the display panel is connected with an external connection wiring for inputting a drive signal, and a second adhesive material is supplied to at least the remaining portion except for portions where the external connection wiring is disposed. In this way, the display panel is bonded onto the transparent member and the plate-like member, thereby making it possible to prevent the strength deterioration caused by thinning the display panel. That is, a stress from the rear surface, which is applied to the display panel, can be received by the transparent member disposed on the display surface.

Further, a flow stop member is disposed on the plate-like member so that the second adhesive material does not enter a gap between the display panel and the plate-like member. An adhesion material is disposed on the plate-like member to fix the display panel, and the adhesion material can be used as the flow stop member. Further, a convex portion is formed on a portion outside of the display panel on the front surface of the plate-like member. The rear surface of the transparent member and the convex portion of the plate-like member are bonded and fixed to each other with the second adhesive material, and the adhesive area increases. As a result, the strength is improved. Further, when the contour of the plate-like member is larger than the contour of the transparent member, the second adhesive material is more easily supplied.

Further, a room temperature curable adhesive is suitable as the second adhesive material. In the thin-type display device, because a gap between the transparent member and the plate-like member is as small as 0.7 mm or lower, it is desirable that the viscosity of the second adhesive material that is supplied to the gap be in a range of 10 to 45 Pa·s (pascal second). The material of the second adhesive material can be exemplified by, for example, acrylic modified silicone resin. Further, the second adhesive material whose hardness after being cured is desirably 50 to 70 in shore A hardness. The second adhesive material is more readily supplied when the contour of the plate-like member is larger than the contour of the transparent member. Further, a transparent optical adhesive may be used as the first adhesive material, whereby the display surface of the display panel is bonded to the entire surface of the transparent member.

Here, the transparent member that is disposed on the display surface side can be exemplified by a touch panel, a touch switch, or a protective plate that is made of acrylic such as a PMMA or hardened glass. The plate-like member is a component that is disposed on the rear surface side of the display panel, and can be formed of the similar member (for example, hardened glass) to that of the transparent member that is disposed on the display surface side. Alternatively, the plate-like member can be exemplified by, for example, a plastic frame, or an optical component of the back side light source which is used when a display element is of the non-self-emitting type, such as the light guide plate or the diffuser.

Further, if the display element is a non-self-emitting display panel such as the liquid crystal panel, the optical component of the back side light source can be used as the plate-like member. Then, a flow stop member is disposed on the plate-like member so that the second adhesive material does not enter the gap between the liquid crystal panel and the plate-like member. In this situation, an adhesion material that allows the liquid crystal panel to adhere to the plate-like member is provided, and the adhesion material has a flow stop function.

More specifically, the light guide plate is used as the plate-like member, an optical sheet is arranged on the light emission surface of the light guide plate, and the liquid crystal panel is fixed to the light guide plate with the adhesion material that is disposed around the optical sheet. In this case, a concave portion larger than the contour of the optical sheet is formed in the light guide plate at a depth substantially equal to or deeper than a thickness of the optical sheet, and the optical sheet may be incorporated into the concave portion. Alternatively, a frame that fixes the light guide plate is used as the plate-like member, an opening portion into which the light guide plate is fitted is defined in the frame, the optical sheet is disposed between the light guide plate and the liquid crystal panel, and the liquid crystal panel may be fixed to the frame by the adhesion material. When the optical sheet such as a diffusion film or a lens film is used, the flow stop of the second adhesive material is disposed so that the second adhesive used for reinforcement does not penetrate up to the position of the optical sheet, thereby making it possible to eliminate the optical adverse affect.

A flange for securing the light guide plate to the portable electronic device is disposed on the light guide plate except for the corners. The electronic device is of a structure in which a rubber for absorbing the impact is arranged above the flange, and an exterior case having an opening portion so as to be combined with the hardened glass portion is assembled with the electronic device. Further, according to the present invention, there is provided an electronic device with a structure in which a display device including a display panel, a transparent member that is disposed on a display surface side of the display panel, and a plate-like member that is disposed on a rear side of the display panel is held by an exterior case. A portion in which the rear surface of the transparent member and a front surface of the plate-like member are overlapped with each other outside of the display panel is bonded and fixed by an adhesive material, a flange is disposed on the plate-like member in an outer direction from an adhesive portion, and a shock absorbing member is disposed between the flange and the exterior case to hold the display device.

According to the present invention, even when the individual members that constitute the display device are thinned, to improve the strength of the display device, the individual members are integrated together with the transparent member that is disposed on the display surface. Therefore, the excellent advantages can be obtained with the structure in which the thickness of the substrate that constitutes the display panel is 0.1 to 0.2 mm, the thickness of the plate-like member such as the light guide plate is 0.2 to 0.6 mm, more particularly, about 0.2 to 0.3 mm. Hereinafter, a description is given in more detail of embodiments when a liquid crystal display is used as the display panel, and a protective plate or a touch panel is used as the transparent plate.

First Embodiment

Figure 1:
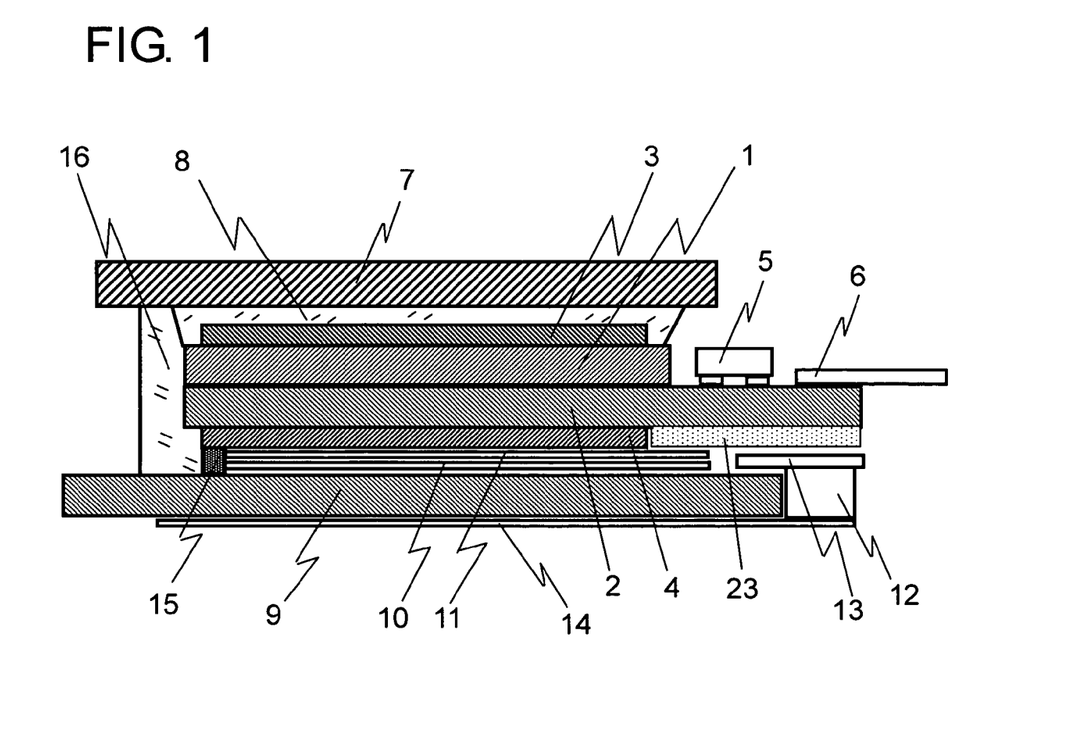
FIG. 1 is a schematic diagram illustrating a cross-sectional structure of a display device according to a first embodiment of the present invention.
Figure 2:
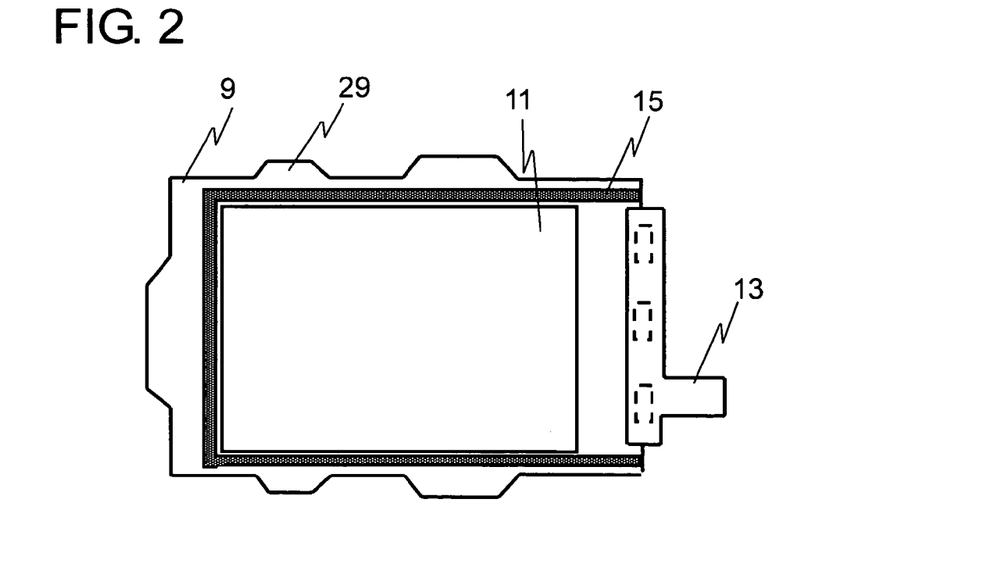
FIG. 2 is a top perspective view illustrating a backlight used in the first embodiment of the present invention.
Figure 3:
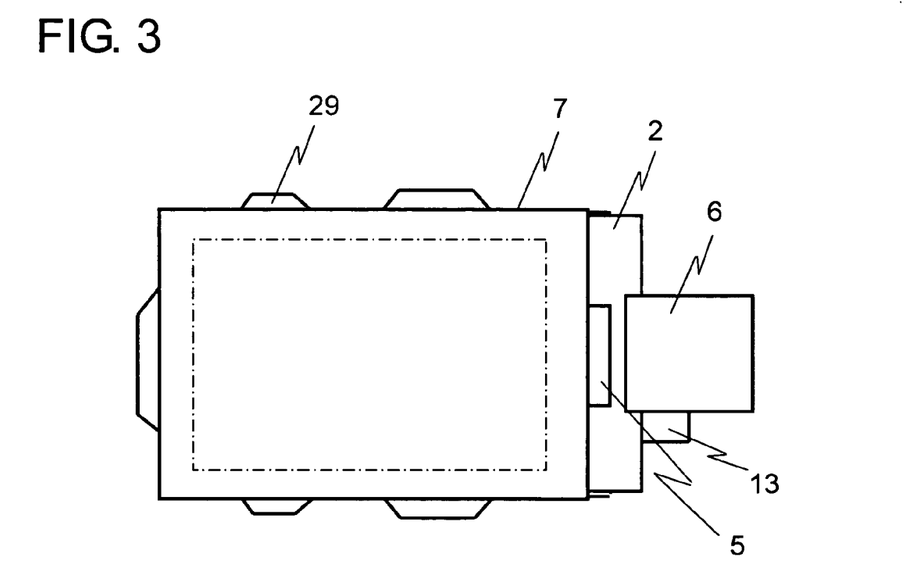
FIG. 3 is a top view illustrating the display device according to the first embodiment of the present invention.

A first embodiment of the present invention is described with reference to FIGS. 1 to 3. FIG. 1 schematically illustrates a cross-sectional structure of a first embodiment. FIG. 2 is a top perspective view schematically illustrating a backlight used in the first embodiment. FIG. 3 is a top view illustrating the first embodiment. A liquid crystal panel is configured in such a manner that liquid crystal is sealed in a gap between a glass substrate 1 that is 0.1 to 0.15 mm in thickness and an opposed glass substrate 2, and the gap is held by a sealing agent (for example, UV curable adhesive) that is disposed on the outer periphery. In this embodiment, a color filter and a transparent electrode are formed on the glass substrate 1, and a TFT array element and a terminal that mounts a driver IC are formed on the opposed glass substrate 2.

In the liquid crystal panel, an absorptive polarizing plate 3 is bonded to a display surface side, and a polarizing element 4 having an absorptive polarizing plate and a light reflection polarizing plate laminated on each other is bonded to a rear surface side. Alternatively, a phase difference correction film may be laminated on the absorptive polarizing plate 3 on the display surface. The polarizing element 4 may be formed of only the absorptive polarizing plate, or another optical element may be further laminated on the absorptive polarizing plate.

A driver IC 5 for driving the liquid crystal is mounted on the opposed glass substrate 2 through an anisotropic conductive film. The opposed glass substrate 2 is also connected with a first film substrate 6 for supplying a signal to the driver IC 5 through the anisotropic conductive film. There may be used a COF in which the driver IC is mounted on the film substrate. A moisture proof coating (not shown) for improving the moisture resistance is applied around the driver IC 5 and the first film substrate 6. A mold material (not shown) is disposed on a portion on which the driver IC 5 is mounted. Further, a spacer 23 having the same thickness as that of the polarizing element 4 that is disposed on the rear surface of the liquid crystal panel is successively bonded on a rear surface of the mounted portion so as not to provide the gap with respect to the polarizing element 4.

A protective plate 7 is bonded to the entire surface of the liquid crystal panel on the display surface side with an optical adhesive 8. In this embodiment, hardened glass (for example, about 1.0 mm in thickness) obtained by chemically strengthening soda lime glass is used as the protective plate 7. All of four sides of the hardened glass that is the protective plate 7 are larger than those of the liquid crystal panel. Further, a frame for forming the viewing area of the liquid crystal panel is disposed on the protective plate. That is, a frame having an opening portion that is slightly larger than the display area of the liquid crystal panel is formed on a rear surface of the hardened glass. The frame is formed by laminating nickel chrome alloy and black ink on each other. Further, a fingerprint prevention coating or an antireflection layer, may be disposed on a front surface of the hardened glass, or a glass scattering prevention film may be bonded on the front surface of the hardened glass. A light curable adhesive can be used as the optical adhesive. Alternatively, the hardened glass and the liquid crystal panel can be bonded on the respective entire surfaces through an optical adhesive sheet.

The backlight includes a second film substrate 13 on which an LED 12 is mounted, and a light guide plate 9 made of polycarbonate, which is 280 μm in thickness. A diffusion film 10 that is 38 μm in thickness is arranged on the light guide plate 9, and a lens sheet 11 that is 64 μm in thickness is arranged on the diffusion film 10. In order to obtain luminance, another lens sheet can be further added. Further, in order to eliminate moiré patterns which occur when the two lens sheets are laminated on each other, another diffusion sheet can be further laminated thereon. As illustrated in FIG. 2, three LEDs 12 are mounted linearly on the second film substrate 13. It is desirable that the second film substrate 13 be arranged so that light emission portions of the LEDs 12 are in close contact with a side surface (that is, light input surface) of the light guide plate 9 as much as possible. As illustrated in FIG. 1, the LEDs are arranged on the same side as that of the terminal of the liquid crystal panel, on which the driver IC 5 is mounted. A reflection sheet 14 on which silver is deposited is bonded to the light guide plate with a double-faced tape (not shown) which is disposed outside of the viewing area on a rear surface of the light guide plate. Further, light reflectors are disposed on the light input surface and a side surface on the opposite side of the light input surface, whereby a light that is going to be output from the side surface returns to the interior of the light guide plate. As a result, the light is not leaked to the outside, and light emission efficiency is improved. For example, an ink that reflects light, such as a white ink, is disposed on at least one side surface as a reflective material, to thereby prevent light efficiency from being deteriorated. The reflective material may be formed on the side surface other than the light input surface.

As illustrated in FIG. 2, an adhesion material 15 that is about 100 μm in height is disposed in a U-shape on the light guide plate 9, and formed so as to surround the diffusion film 10 and the lens sheet 11 described above. In this embodiment, the sheet having the optical function such as the diffusion film or the lens sheet is generally referred to as "optical sheet".

The adhesion material 15 is bonded so that leading edges of the U-shaped adhesion material 15 surround a portion extending from one terminal portion of the liquid crystal panel to the other terminal portion thereof. The liquid crystal panel is fixed to the light guide plate 9 of the backlight with the adhesion material 15. As a result, the protective plate 7, the liquid crystal panel, and the backlight are fixed to each other. Further, a room temperature curable adhesive 16 is applied along the outer periphery of the U-shaped adhesion material 15, and then cured. In this situation, the adhesion material 15 has a function of preventing the penetration of the adhesive 16. Then, the adhesive 16 is bonded to a rear surface of the protective plate 7 and an upper surface of the light guide plate 9. As a result, the adhesive 16 is disposed between the rear surface of the protective plate 7 and the upper surface of the light guide plate 9, and the side surface of the liquid crystal panel, the rear surface of the protective plate 7, and the upper surface of the light guide plate 9 are integrally bonded to each other. Since the adhesive 16 thus covers the side surface of the liquid crystal panel, it is possible that protection is conducted against the peeling force that is applied to the seal of the liquid crystal panel with the adhesive 16.

In this embodiment, the U-shaped adhesion material 15 is disposed to adhesively fix the light guide plate and the liquid crystal panel to each other. However, the adhesion portions can be reduced as the occasion demands. The double-faced adhesive tape can be used as the adhesion material. Further, the corners of the light guide plate can be further reinforced by using another adhesive. The kind of adhesive 16 is not limited to one kind. A method of fixing the protective plate and the display panel is not limited to entire surface adhesion using the optical transparent adhesive 8, but the display area outer periphery may be fixed by an adhesive. Similarly, when a metal frame is covered in the outer periphery of the liquid crystal panel, the transparent member and the plate-like member can be bonded to each other.

Further, as illustrated in FIG. 2, a flange 29 for fixation is disposed on a part of the outer periphery of the light guide plate 9. The flange 29 is incorporated into the exterior case of the electronic device through a shock absorbing material. The flange 29 can be enlarged or thickened according to the degree of the impact, to thereby improve the strength.

Second Embodiment

Figure 4:
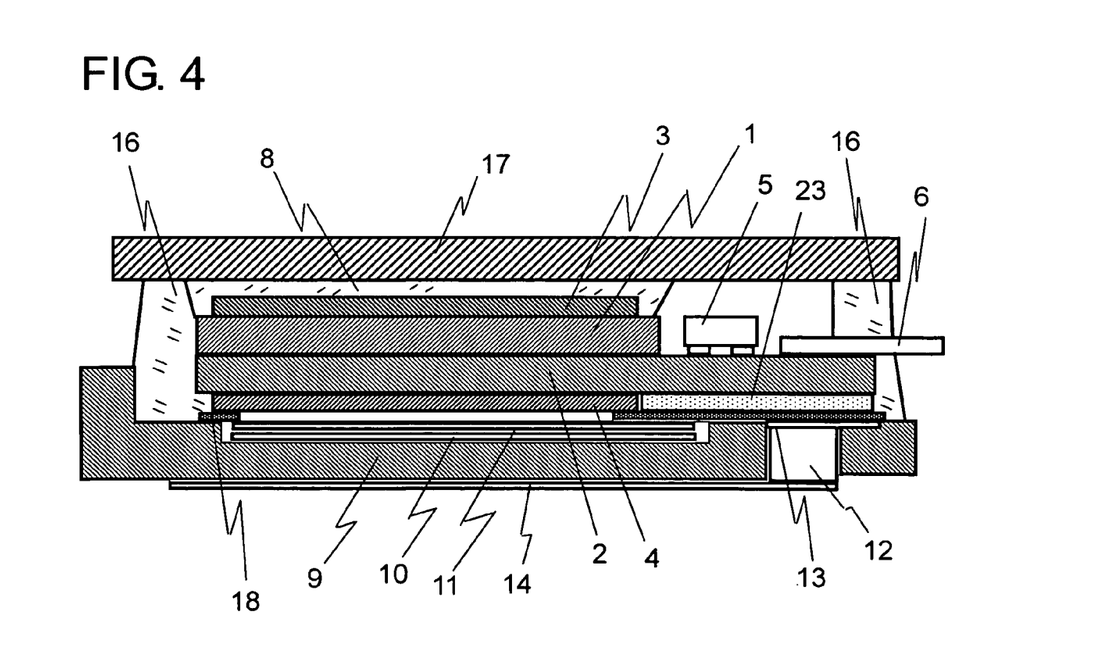
FIG. 4 is a schematic diagram illustrating a cross-sectional structure of a display device according to a second embodiment of the present invention.
Figure 5:
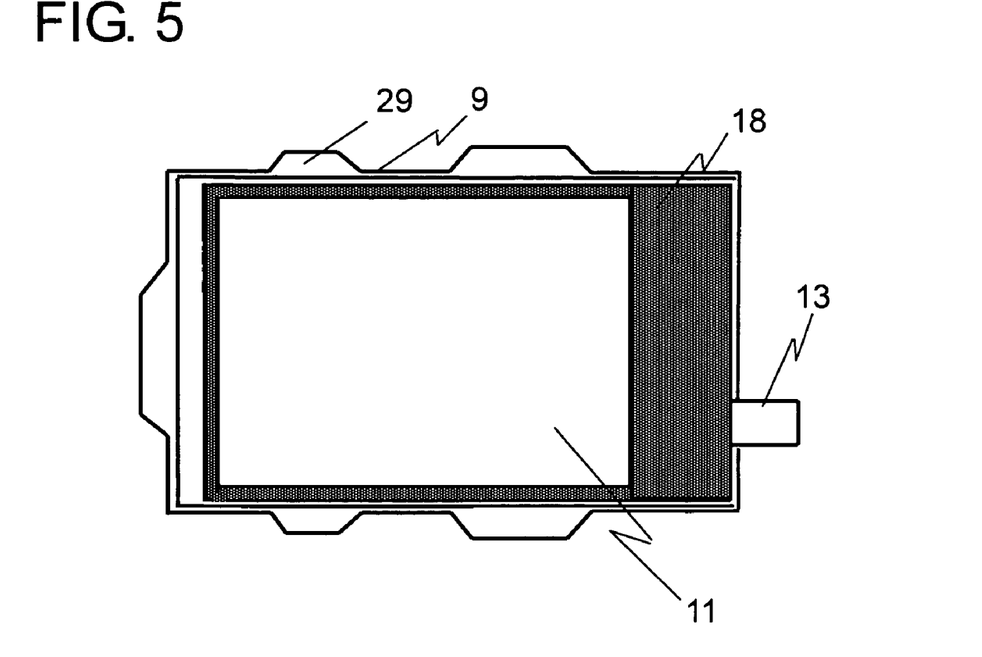
FIG. 5 is a top perspective view illustrating a backlight used in the second embodiment of the present invention.
Figure 6:
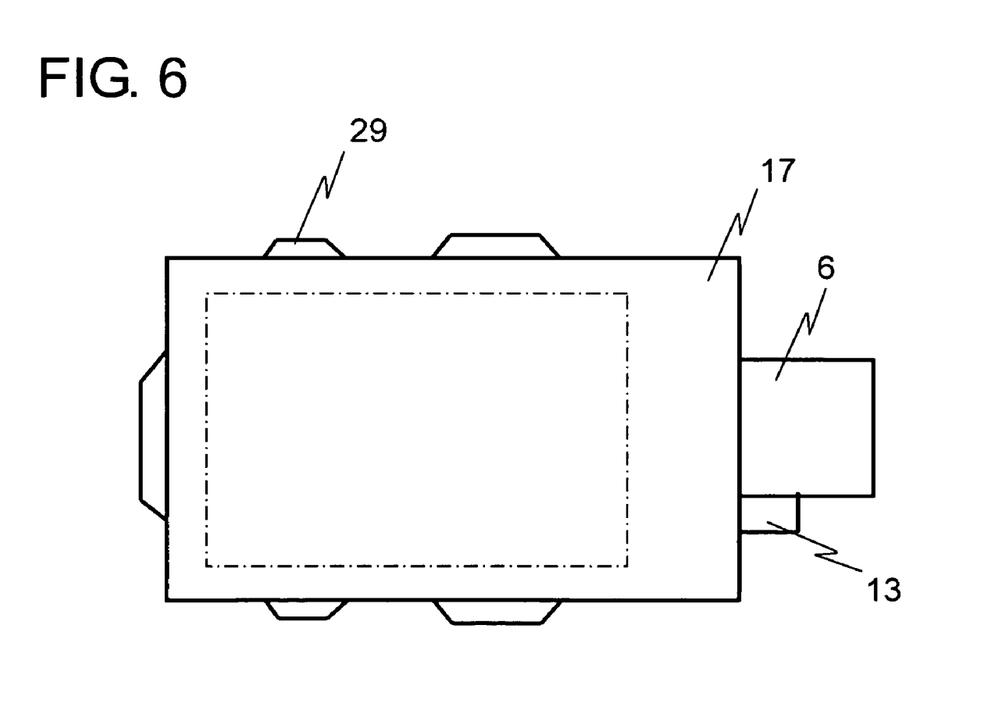
FIG. 6 is a top view illustrating the display device according to the second embodiment of the present invention.

Hereinafter, a description is given of a second embodiment of the present invention with reference to FIGS. 4 to 6. FIG. 4 schematically illustrates a cross-sectional structure of a second embodiment. FIG. 5 is a top perspective view schematically illustrating a backlight used in the second embodiment. FIG. 6 is a top view illustrating the second embodiment. The second embodiment is different from the first embodiment in the detailed structure of the backlight and the position of the adhesive 16 that is disposed on the outer periphery of the liquid crystal panel. The duplicated description of the first embodiment such as the structure of the liquid crystal panel is appropriately omitted.

A touch panel 17 is bonded to the entire surface of the display side of the liquid crystal panel with the optical adhesive 8. The touch panel has various systems and various structures. In this embodiment, PET films on which transparent conductive films are formed face each other. Further, a film that is subjected to exterior printing is bonded to the entire surface of the display surface side, and polycarbonate that is 0.8 mm in thickness is bonded to the entire surface of the rear surface side as a base.

The backlight includes a second film substrate 13 on which the LED 12 is mounted, and a light guide plate 9 made of polycycloolefin resin which is 390 μm in thickness of a base material. A concave portion of about 110 μm is formed in the light emission region of the light guide plate. Accordingly, the thickness of the light guide plate in the light emission region is about 280 μm. Further, the light emission region is set in a range larger than the display region of the liquid crystal panel. The diffusion film 10 that is 38 μm in thickness and the lens sheet 11 that is 64 μm in thickness are disposed into the concave portion in the stated order. In order to obtain luminance, another lens sheet can be further added. Further, in order to eliminate moiré patterns which occur when the two lens sheets are laminated on each other, another diffusion sheet can be further laminated thereon. The lens sheet 11 and the diffusion film 10 have the same structure, and the concave portion of the light guide plate 9 is slightly larger than the contour of those optical films, and formed at a depth substantially equal to the total thickness of those optical films. The concave portion may be successively formed up to the LED 12. In this case, a protrusion for regulating the position of the two films can be situated at positions of the corners of the two films on the LED side.

As illustrated in FIG. 5, it is desirable that light emission portions of the LEDs 12 be in close contact as much as possible with the side surface (that is, light input surface) of the light guide plate 9, in which three LEDs 12 are linearly mounted on the second film substrate 13. The light guide plate according to this embodiment is so configured as to extend toward the contour side from the LEDs, and has an opening into which the respective LEDs 12 are fitted. Then, the double-faced tape is disposed on a portion that extends toward the contour side of the light guide plate so that light emission surfaces of the LEDs and the light input surface of the light guide plate are in close contact with each other as much as possible, to fix the light guide plate and the second film substrate.

As the adhesion material for fixing the liquid crystal panel to the backlight thus configured, a light shield double-faced tape 18 is disposed on the light guide plate 9. As illustrated in FIG. 5, the light shield double-faced tape 18 is formed in an O-shape so as to surround the LED. In the light shield double-faced tape 18, the light guide plate side is white, and the liquid crystal panel side is black. In this embodiment, due to the light shield double-faced tape 18, the adhesive 16 is prevented from entering a gap between the liquid crystal panel and the light guide plate, and light emission from the light guide plate is prevented from being emitted to the display region of the display panel. The structure of the light shield double-faced tape is not limited to the O-shape, but can be selected from a U-shape configuration or a broken line configuration according to a purpose of providing the light shield double-faced tape. Further, the light shield double-faced tape 18 is bonded onto the lens sheet 11 and the light guide plate 9 at a position in which the light shield double-faced tape 18 does not protrude to the display region, to fix the lens sheet 11 and the diffusion film 10 that is located under the lens sheet 11.

The liquid crystal panel is bonded and fixed to the light guide plate 9 of the backlight with the light shield double-faced tape 18. With the above-mentioned structure, the touch panel 17, the liquid crystal panel, and the backlight are fixed to each other. Further, the room temperature curable adhesive 16 is applied on the four outer peripheral sides of the liquid crystal panel, and then cured. The adhesive 16 is bonded to the rear surface of the touch panel 17 and the upper surface of the light guide plate 9. As a result, the adhesive 16 is disposed between the rear surface of the touch panel 17 and the upper surface of the light guide plate 9, and the side surface of the liquid crystal panel, the rear surface of the touch panel 17, and the upper surface of the light guide plate 9 are integrally bonded to each other. When the outer periphery (that is, a portion on which the adhesive 16 is applied) of at least a part of the light guide plate is convexed, the adhesion area of the light guide plate and the adhesive 16 increases to improve the adhesive force. In this embodiment, as illustrated in FIG. 4, the convex configuration having a height of about the half of the thickness of the liquid crystal panel is manufactured in the U-shape on the light guide plate outside of the liquid crystal panel. The adhesive 16 is supplied between the rear surface of the touch panel and the convex portion of the light guide plate. As illustrated in FIG. 4, as the contour of the light guide plate 9 having the convex portion is larger than the contour of the touch panel 17, the adhesive 16 is more easily supplied. Further, the contour of the touch panel 17 can be set inside of an inner side surface of the convex portion as the occasion demands.

Further, the gap between the touch panel and the light guide plate, which is a gap to which the adhesive 16 is supplied, is narrow so as to be equal to or lower than 0.7 mm. For that reason, it is preferable that the viscosity of the adhesive 16 be in a range of 10 to 45 Pa·s. In this situation, the adhesive 16 is also supplied to the side surface of the liquid crystal panel. Further, the adhesive 16 reaches the light shield double-faced tape 18, but the light shield double-faced tape 18 is provided with a function of preventing the penetration of the adhesive 16, whereby the adhesive 16 does not enter the light emission region of the backlight. Then, it is proper that the adhesive 16 be of the room temperature curable type so that the adhesive 16 is cured when being left for a given period of time. In this embodiment, acrylic modified silicone resin that is 25 Pa·s in viscosity is used as the adhesive 16. Further, in order to prevent illumination light from a backlight source from being leaked from the side, it is desirable to use black resin. It is preferable that the hardness of the adhesive 16 after curing be 50 to 70 in shore A hardness. Further, an adhesive that is high in thixotropy or the same adhesive as in the first embodiment can be used for the light shield double-faced tape 18.

The front and rear surfaces of the first flexible substrate 6 of the liquid crystal panel are bonded by the adhesive 16, but the first flexible substrate 6 can be led through a slender hole which is defined in the light guide plate so as not to be in direct contact with the adhesive 16 on the terminal side. Further, the adhesive 16 can be supplied to three sides except for the terminal side as in the first embodiment.

Third Embodiment

Figure 7:
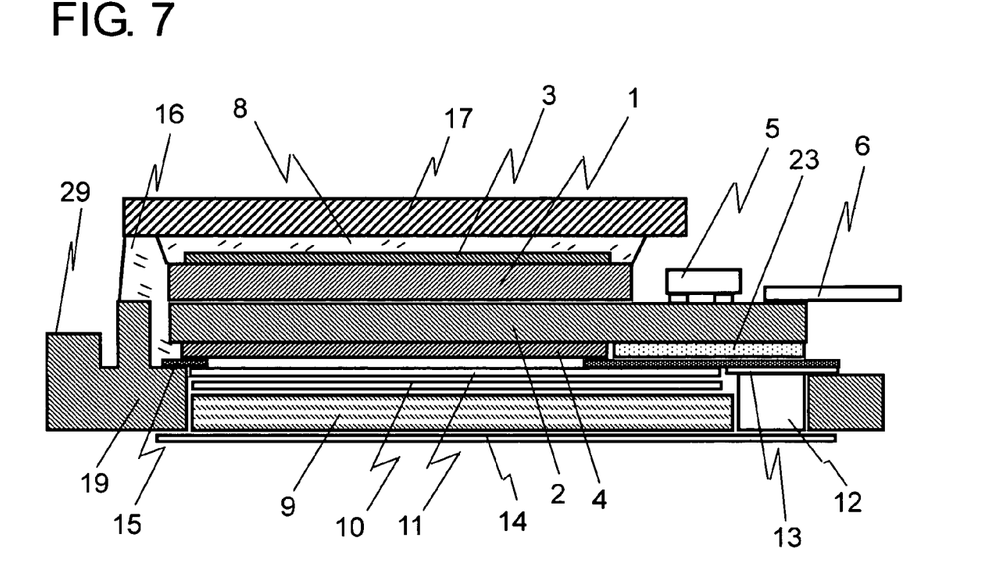
FIG. 7 is a schematic diagram illustrating the cross-sectional structure of a display device according to a third embodiment of the present invention.

Hereinafter, a description is given of a third embodiment of the present invention with reference to FIG. 7. FIG. 7 is a diagram schematically illustrating a cross-sectional structure of the third embodiment. The third embodiment is different from the second embodiment in the detailed structure of the backlight. The duplicated descriptions of the first and second embodiments are appropriately omitted.

The entire surface of the touch panel 17 adheres to the display surface side of the liquid crystal panel with the optical adhesive 8. The backlight includes the second film substrate 13 on which the LED 12 is mounted, the light guide plate 9, and a frame 19. The frame 19 is made of white polycarbonate, and has an opening into which the light guide plate is fitted. The frame 19 and the liquid crystal panel are fixed to each other with the adhesion material 15. In this embodiment, a double-faced adhesive tape is used as the adhesion material to fix the liquid crystal panel and the frame to each other.

In general, the light guide plate 9 and the LED 12 are housed in the frame 19, and the reflection film 14 is bonded onto the light guide plate 9 and the LED 12. Then, optical sheets such as the diffusion sheet 10 and the lens sheet 11 are provided on the light guide plate. Then, the double-faced adhesive tape is disposed, and the optical sheets are fixed to the frame with one surface of the tape. Thereafter, the liquid crystal panel is fixed to the frame with another surface of the double-faced adhesive tape. In the structure in which the opening is defined in the frame as in this embodiment, after the LED has been fitted into the frame 19, the lens sheet 11 and the diffusion sheet 10 are assembled into the opening of the frame in the stated order, the light guide plate 9 is fitted into the frame 19, and the reflection film is fixed to the frame 19 with the double-faced adhesive tape. The assembling can be conducted in the above-mentioned order.

As described above, the touch panel, the liquid crystal panel, and the backlight are fixed to each other. Further, the adhesive 16 of the room temperature curable type is supplied to the side surface along the three outer peripheral sides of the liquid crystal panel, and then cured. The adhesive 16 allows the rear surface of the touch panel 17 and the upper surface of the frame 19 to adhere to each other together with a protrusion that is disposed on the outer peripheral portion of the frame. As a result, the adhesive 16 is disposed between the rear surface of the touch panel 17 and the upper surface of the frame 19, and the side surface of the liquid crystal panel, the rear surface of the touch panel 17, and the upper surface of the frame 19 are integrally bonded to each other. In this embodiment, the double-faced adhesive tape is formed in an O-shape on the frame 19, but the adhesive 16 is supplied to the three side surfaces except for a side on which the driver IC 5 is mounted.

In this embodiment, a protrusion is disposed on the frame, but the protrusion may not be provided, or may be partially provided. The same is applied to the light guide plate 9 described in the first and second embodiments, and the protrusion may be provided or may not be provided.

Fourth Embodiment

Figure 8:
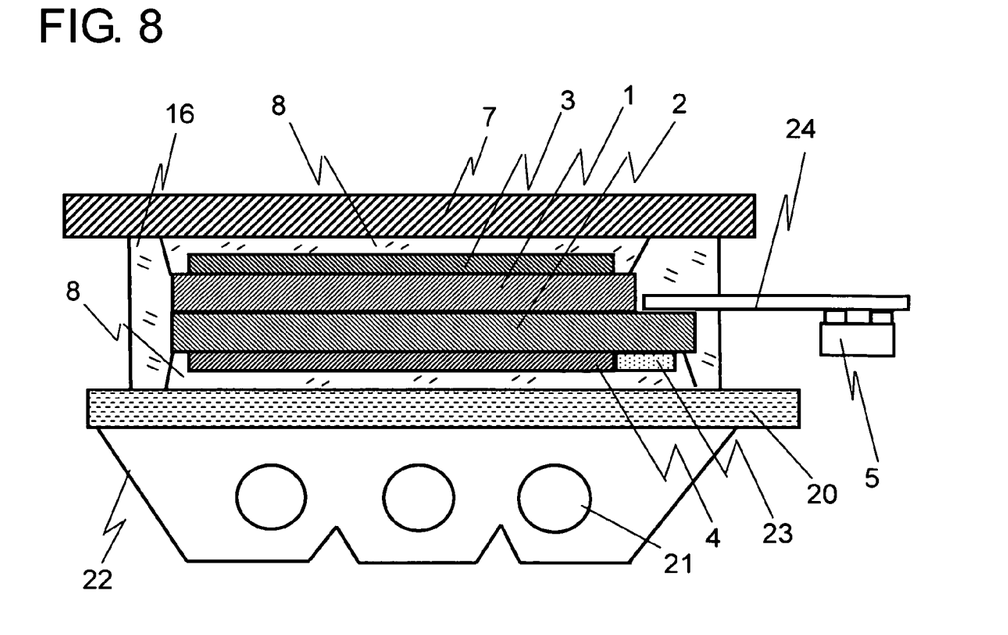
FIG. 8 is a schematic diagram illustrating the cross-sectional structure of a display device according to a fourth embodiment of the present invention.

Hereinafter, a description is given of a fourth embodiment of the present invention with reference to FIG. 8. FIG. 8 schematically illustrates a cross-sectional structure of this embodiment. The fourth embodiment is largely different from the above-mentioned embodiments in that a direct type backlight is used. The duplicated descriptions of the above-mentioned respective embodiments are appropriately omitted. This embodiment is suitable particularly for a large-sized liquid crystal panel, and suitable for a screen size of 12 inches or more. As illustrated in FIG. 8, in this embodiment, a film substrate 24 on which the driver IC 5 is mounted is connected to the terminal of the liquid crystal panel with anisotropic conductive film. A moisture proof coating (not shown) is applied on the periphery of the film substrate 24 and the terminal area of the liquid crystal panel in order to improve the moisture resistance.

Further, the entire surface of the protective plate 7 made of hardened glass is bonded to the display surface side of the display panel with the optical adhesive 8. The protective plate is subjected to a chemical strengthening process with a soda lime glass. A frame in which nickel chrome alloy and black ink are laminated on each other is formed on the rear surface at a position that is overlapped with the periphery of the display portion. A fingerprint prevention coating or an anti-reflection layer, or a glass scattering prevention film may be bonded onto the front surface of the protective plate. The protective plate and the liquid crystal panel may be bonded to the respective entire surfaces with an aid of the optical adhesive sheet.

In this embodiment, the direct type backlight is used, and a diffusion plate 20 made of milky white acrylic which is 3 mm in thickness is bonded to the entire rear surface side of the liquid crystal panel with the optical adhesive 8. The protective plate 7 and the diffusion plate 20 are bonded and fixed along the outer periphery of the liquid crystal panel with the adhesive 16. The optical adhesive 8 also serves as a flow stop prevention member of the adhesive 16. A cold cathode fluorescent tube 21 is disposed on the rear surface side of the diffusion plate 20, and a reflector 22 that is so configured as not to produce luminance unevenness is further arranged on the rear surface side of the cold cathode fluorescent tube 21.

In this embodiment, the cold cathode fluorescent tube is used as the light source, but a hot cathode fluorescent tube or an LED of the top surface light emission type may be used. Further, the acrylic member is used for the diffusion plate, but fogged glass that is subjected to chemical strengthening or cooling strengthening may be used. The plate-like member may be formed of not only the backlight member but also transparent glass.

Further, the present invention is not limited to a structure in which the entire surfaces of the liquid crystal panel and the diffusion plate 20 are bonded to each other. Alternatively, the diffusion plate 20 may be fixed to the display area outer periphery with a penetration inhibitor of the adhesive, and its outer periphery may be fixed with the adhesive 16.

Further, it is not always necessary that the transparent plate such as the protective plate, which is disposed on the display surface side, be bonded to the entire surface of the liquid crystal panel. Alternatively, the display area outer periphery may be fixed with the double-faced tape, and the transparent plate and the diffusion plate may be fixed to each other with the adhesive 16 as in the above-mentioned embodiments.

The size of the screen of the liquid crystal panel is not particularly restricted, but may be 40 inches or more. The liquid crystal panel has been described as the display panel, but the present invention is not limited by the display system, and an organic EL and a plasma display can be applied.

As has been described above, the display panel is sandwiched and bonded between the transparent plate and the plate-like member, with the result that the impact resistance of the display panel is remarkably improved. When the backlight member is used as the plate-like member, the display device can be configured without being affected by the thickness.

What is claimed is:

1. A display device comprising:
   a display panel having first and second opposing glass substrates forming a display surface and each having a thickness in the range of 0.1 mm-0.2 mm;
   a transparent member bonded to the entire display surface of the display panel and having an overall dimension greater than that of the first glass substrate;
   a first adhesive material comprised of a transparent optical adhesive that bonds the transparent member to the entire display surface of the display panel;
   a plate-like member having an overall dimension greater than that of the second glass substrate and being disposed on a rear side of and supporting the display panel; and
   a second adhesive material disposed between a rear surface of the transparent member and a front surface of the plate-like member to bond the transparent member and the plate-like member at overlapping portions thereof disposed at a region outside of the display panel.

2. A display device according to claim 1; further comprising a flow stop member formed on the plate-like member for preventing the second adhesive material from entering a gap between the display panel and the plate-like member.

3. A display device according to claim 2; wherein the flow stop member comprises an adhesion material that fixedly bonds the display panel to the plate-like member.

4. A display device according to claim 1; wherein the plate-like member has a convex portion formed on a portion of the front surface of the plate-like member at the region outside of the display panel; and wherein the second adhesive material is disposed between the rear surface of the transparent member and the convex portion of the plate-like member so that the transparent member is fixedly bonded to the convex portion of the plate-like member.

5. A display device according to claim 1; wherein the display panel is a liquid crystal panel; and further comprising a back light source for illuminating the liquid crystal panel, the plate-like member being an optical component of the back light source.

6. A display device according to claim 5; further comprising an optical sheet disposed between the optical component and the liquid crystal panel, the optical component comprising a light guide plate provided with a concave portion larger than a contour of the optical sheet that is formed at a depth substantially equal to or deeper than a thickness of the optical sheet, the optical sheet being incorporated into the concave portion.

7. A display device according to claim 6; wherein the liquid crystal panel is fixedly bonded to the light guide plate with an adhesion material that prevents the second adhesive material from entering a gap between the liquid crystal panel and the light guide plate.

8. A display device according to claim 5; wherein the plate-like member comprises a light guide plate; and further comprising an optical sheet disposed on a light emission surface of the light guide plate, and an adhesion material disposed around the optical sheet and fixedly bonding the liquid crystal panel to the light guide plate and preventing the second adhesive material from entering a gap between the display panel and the light guide plate.

9. A display device according to claim 5; wherein the optical component comprises a frame having an opening; and further comprising a light guide plate fitted into the opening of the frame, and an adhesion material fixedly bonding the liquid crystal panel to the frame and preventing the second adhesive material from entering a gap between the display panel and the light guide plate.

10. A display device according to claim 1; wherein the second adhesive material is a room temperature curable adhesive.

11. A display device according to claim 10; wherein a viscosity of the room temperature curable adhesive at the time of application is set to 10 to 45 Pa·s.

12. A display device according to claim 9; wherein the frame has a convex portion at the region outside of the liquid crystal panel; and wherein the second adhesive material fixedly bonds the rear surface of the transparent member to the convex portion of the frame.

13. A display device according to claim 1; wherein the display panel comprises a liquid crystal panel and the plate-like member comprises a diffusion plate; and further comprising a back light source that illuminates the liquid crystal panel and has the diffusion plate, and a third adhesive material formed of the same material as that of the first adhesive material and bonding the diffusion plate to an entire rear surface of the liquid crystal panel.

14. A display device comprising:
   a display panel having first and second opposing glass substrates forming a display surface;
   a transparent member having an overall dimension greater than that of the first glass substrate;
   a first adhesive material bonding the transparent member to the entire display surface of the display panel;
   a plate-like member having an overall dimension greater than that of the second glass substrate and being disposed on a rear side of and supporting the display panel; and
   a second adhesive material different from the first adhesive material and disposed between a rear surface of the transparent member and a front surface of the plate-like member so as to fixedly bond the transparent member and the plate-like member to one another.

15. A display device according to claim 14; wherein the first adhesive material comprises a transparent optical adhesive; and wherein each of the first and second glass substrates has a thickness in the range of 0.1 mm to 0.2 mm.

16. A display device according to claim 14; wherein the plate-like member is disposed on the rear side of and supports the display panel with a gap formed between the display panel and the plate-like member; and further comprising an adhesion material fixedly bonding the display panel to the plate-like member and preventing the second adhesive material from entering the gap between the display panel and the plate-like member.

17. A display device according to claim 14; wherein the display panel is a liquid crystal panel; and further comprising a back light source for illuminating the liquid crystal panel, the plate-like member comprising a light guide plate of the back light source.

18. A display device according to claim 17; further comprising an optical sheet disposed between the light guide plate and the liquid crystal panel, the light guide plate having a concave portion larger than a contour of the optical sheet that is formed at a depth substantially equal to or deeper than a thickness of the optical sheet, and the optical sheet being incorporated into the concave portion.

19. A display device according to claim 18; wherein the liquid crystal panel is fixedly bonded to the light guide plate with an adhesion material that prevents the second adhesive material from entering a gap between the liquid crystal panel and the light guide plate.

* * * * *